United States Patent
Trozera

[19]

[11] Patent Number: 5,884,954
[45] Date of Patent: Mar. 23, 1999

[54] LOCKING TWEEZERS FOR TYING FLY-FISHING HOOKS

[76] Inventor: Thomas Trozera, 437 Pine Needles Dr., Del Mar, Calif. 92014

[21] Appl. No.: 869,296

[22] Filed: Jun. 4, 1997

[51] Int. Cl.[6] ............................. A01K 97/26; B25B 9/02
[52] U.S. Cl. ............................................................. 294/100
[58] Field of Search ........................ 294/8.5, 11, 16, 294/33, 99.2, 100, 116; 7/106; 29/270, 278; 43/4, 5, 53.5, 54.1; 81/3.8, 427, 427.5; 269/907; 606/210

[56] References Cited

U.S. PATENT DOCUMENTS

| | | | |
|---|---|---|---|
| 776,555 | 12/1904 | Settle | 294/99.2 X |
| 1,108,299 | 8/1914 | Wisman | 294/99.2 |
| 1,284,060 | 11/1918 | Culman | 294/99.2 |
| 1,298,702 | 4/1919 | Harshaw | 294/100 X |
| 2,068,184 | 1/1937 | Knopp | 294/100 |
| 3,316,949 | 5/1967 | Canfield | 294/100 X |
| 3,399,583 | 9/1968 | Hall | 294/99.2 |
| 3,754,290 | 8/1973 | Nicholson . | |
| 3,825,961 | 7/1974 | Klein . | |
| 4,054,969 | 10/1977 | Vogt . | |
| 4,208,749 | 6/1980 | Hermann et al. . | |
| 4,318,313 | 3/1982 | Tartaglia . | |
| 4,442,837 | 4/1984 | Keatley | 294/99.2 X |
| 4,796,318 | 1/1989 | Bigej . | |
| 5,207,012 | 5/1993 | Lael . | |
| 5,568,698 | 10/1996 | Harding et al. . | |

*Primary Examiner*—Johnny D. Cherry
*Attorney, Agent, or Firm*—Michael E. Klicpera, Esq.

[57] ABSTRACT

Fly-fishing tweezers which are engageable with hackle or fishing line are formed from either metallic or polymeric material and include a pair of substantially parallel legs that extend from a proximal joint end. Each end of the legs of the fly-fishing tweezers is formed with an inwardly directed gripping member which has a friction bearing surface that will fixedly engage the hackle or fishing line. Furthermore, the tweezers are fitted with a locking slide that when moved in the distal direction, flexes the legs together and holds the gripping portions together. The fly-fishing tweezers include a rod member extending from the proximal end of the tweezers designed to be placed between the index finger and the thumb of an operator to faciliate the rotation of the tweezers around an axis, such as a fishing hook.

7 Claims, 1 Drawing Sheet

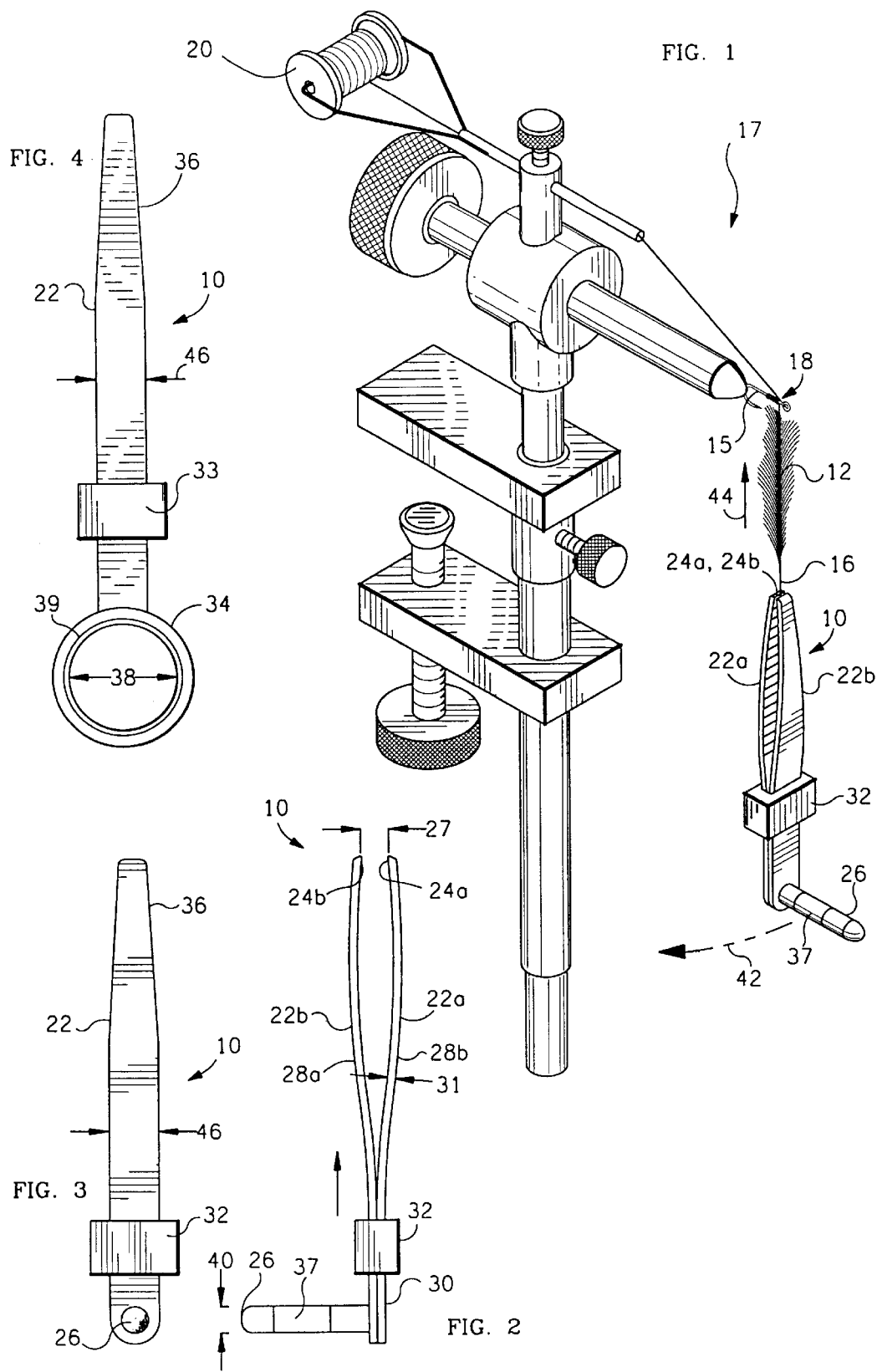

LOCKING TWEEZERS FOR TYING FLY-FISHING HOOKS

FIELD OF THE INVENTION

The present invention pertains generally to fly-fishing tools. More particularly, the present invention pertains to a specifically configured pair of tweezers that function to effectively assist one in threading and typing a bead head or other fly-fishing items such as a small weight, on one member, such as a fishing hook, or on another member, such as other fishing accessories.

BACKGROUND OF THE INVENTION

The use of Fishermans' pliers, tweezers or fishing tools for the purposes of holding, tying, and retaining one member (e.g., hackle) relative to another body (e.g., a fishing hook) has been widely practiced for some time. Exemplary of early devices which were designed and intended for use as fishing tools is U.S. Pat. No. 5,568,698 which was issued to Harding on Oct. 29, 1996, for an invention entitled "Multipurpose Fishing Tool." Another example of fishing pliers is provided by U.S. Pat. No. 5,207,012 which issued to Lael on May 4, 1993 for an invention entitled "Fisherman's Pliers." Still another example of a fishing pliers is provided by U.S. Pat. No. 4,796,318 which issued to Bigej on Jan. 10, 1989 for an invention entitled "Fisherman's Pliers." Each of these examples is typical of the types of fishing tools or pliers which rely on an inherent ability of the tools or pliers to reconfigure itself for complete engagement of the distal tip with a particular item.

In many applications it is desirable that fishermens' pliers or tweezers provide a stable fastening means against which a structure, such as a hackle, can be positioned and held stationary. To accomplish this, however, it is necessary for the operator of the fishing tool to maintain hand or finger pressure on the handle end of the pliers or tweezers to maintain engagement of the distal gripping means with the hackle or fishing line. While the pliers or tweezers are engaged with the hackle, the tweezers, in the present invention, are used to facilitate treading the hackle over the fishing hook shaft and position it is a predetermined location for tying.

In addition to the functional considerations mentioned above, it is also of practical importance that the tweezers be easily engaged with and disengaged from the particular hackle or fishing line with which it cooperates. The preferred method for maintaining engagement, of course, would, be a one-step locking operation wherein the legs of the tweezers are flexed toward each other, forcing the distal gripping means to engage the hackle or fishing line.

Likewise, the preferred method for disengagement would be effectively another one-step operation. The present invention incorporates a sliding locking mechanism which flexes the legs toward each other when moved to its distal direction and releases the legs when the moved to its proximal position.

In light of the above, it is an object of the present invention to provide lockable tweezers for holding a hackle or other fishing items that are engaged with a fishing line to establish an effective means to facilitate the threading of the hackle or fishing line over the shaft of a fishing hook to generate a final fishing hook/hackle fly.

It is another object of the present invention to provide a locking mechanism which can be slid distally or proximately along the pair of legs in a one-step operation.

Still another object of the present invention is to provide a lockable tweezers for tying fly-fishing hooks which is relatively easy to manufacture, simple to operation and comparatively cost effective.

SUMMARY OF THE PREFERRED EMBODIMENTS

A lockable fly-fishing tweezer comprising a pair of flexible legs which extend generally parallel to each other and are joined at their proximal (upper) ends. Each leg has an inwardly directed gripping member formed at the distal ends. Further, the legs are flexed such that the gripping members do not engage each other, forming a gap between, in its open, relaxed state. As intended for the present invention, in order to engage the gripping members with the fishing item (e.g., hackle), the hackle is positioned within the gap and between the gripping members of the tweezers. A locking slide is moved from its proximal position to its distal position, causing the legs of the tweezers to flex and move toward each other, closing the gap. As a result of moving the slide to its distal locking position, the gripping members become firmly engaged with a portion with the hackle or fishing line. As intended for the present invention, the engagement of the tweezers with the hackle or fishing line is accomplished in a lockable, one-step, operation. The particular structure of the tweezers makes this possible.

Adjacent to the proximal ends of the tweezers of the present invention, a mechanism is fitted that is designed to assist the operator to hold the tweezers in one's hand. More specifically, the means for assisting the holding of the tweezers comprises a substantially cylindrical or rod member projecting perpendicular from the longitudinal axis of the tweezers. The rod member is configured to allow positioning between the index finger and the thumb of the operator while the tweezers are being used to thread the hackle onto the shaft of the hook. Alternatively, a ring section is mounted near the proximal ends and is configured to substantially conform with the index or fore finger of a typical operator to assist in holding the hackle.

At their respective ends, opposite the proximal ends, each leg of the tweezers is formed with an inwardly directed gripping member. Specifically, each gripping member is formed with a gripping portion which is designed to increase friction when engaging the hackle or fishing line. Various means for accomplishing this task are well known in the art of tweezers or pliers. For example, the portion of the gripping member can be fitted with crosshatching, knurling, or other configuration which increases the frictional force on any member engaged to that portion.

Dimensions for various elements of the fly-fishing tweezers are not extremely important for its proper operation. With this in mind, consider that the radially projecting rod can be designed to include a sleeve which facilitates the rotation between two engaged fingers of the operator. In the alternative embodiment, the ring section adjacent to the proximal ends must be sized to loosely fit the index finger of many different operators. Further, it is necessary for the length of the legs to be equal to each other.

In the operation of the fly-fishing tweezers of the present invention, the hackle or fishing line is located and positioned with a gap between the gripping members with the hole to receive the shaft of the hook is a position not obscured by the tweezer legs. While holding the hackle or fishing line between the gripping members, the locking member is moved from its proximal position to its distal position, causing the flexible legs to move toward each other and close the gap. At this locked position, the hackle or fishing line is engaged firmly within the gripping members.

Once the hackle or fishing line is firmly engaged, the radially projecting member is employed to rotate the tweezers around a remote axis, for example, a fishing hook. In the alternative embodiment, the ring section is employed to rotate the tweezers around an axis.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a perspective view of the fly-fishing tweezers of the present invention used in the intended environment for tying a fishing line or hackle around a fishing hook mounted in a fixture;

FIG. 2 is a top view of one embodiment of the fly-fishing tweezers demonstrating the radially projecting cylindrical member and the locking slide in the proximal position;

FIG. 3 is a side view of one embodiment as seen in FIG. 2 with the locking slide in the proximal position; and FIG. 4 is a side view of another embodiment of the fly-fishing tweezers demonstrating the ring section mounted on the proximal end of the tweezers and the locking slide in the proximal position.

DESCRIPTION OF THE PREFERRED EMBODIMENTS

Referring initially to FIG. 1, the fly-fishing tweezers of the present invention are shown and designated 10. Specifically, as seen in FIG. 1, the fly-fishing tweezers 10 have been engaged with hackle 12 by gripping members 24a and 24b. Locking member 32 is in its distal position and is forcing the legs of the tweezers toward each other. Also shown in FIG. 1 is a typical clamp fixture 17 with fishing line storage spool 20.

The purpose for engaging the fly-fishing tweezers 10 with the fishing item, as illustrated in FIG. 1, is to hold and maintain the hackle 12 in a desired position relative to the fishing hook 18. By holding the radially protruding rod 26 between the index finger and the thumb, the tweezers are then rotated around a central located hook 18 in clockwise direction 42. Direction 42 is shown as clockwise only for purposes of demonstrating the present inventions intended use. Direction 42 can obviously be counter clockwise as well. After each full turn around the central axis, a portion of the fishing line and/or hackle becomes wound around and engaged to the shaft of hook 18. As a consequence of this winding of the hackle 12 around the hook 18, the length 44 between the distal end of the tweezers and the central axis (hook 18) decreases, reducing the arc of each subsequent turn.

The specific details of the first embodiment of fly-fishing tweezers 10 will, perhaps, be best appreciated by reference to FIG. 2. There it will be seen that the legs 22a and 22b of the fly-fishing tweezers 10 are formed from a metallic material when intended for substantial long-term use or of a polymeric material when they are to be discarded after minimal use. For purposes of the present invention, the metallic material that is to be used for the legs 22a and 22b can be made of any material which has sufficient strength and flexibility to perform the functions required for operation of the fly-fishing tweezers 10. Preferably the legs consist of a spring steel, enabling then to be flexed together to the position shown in FIG. 1, and then released to spread apart and form a gap 27 as shown in FIG. 2. The resistance to flexing is of course determined not only by the gauge and physical characteristics of the material used, but also by the width of each leg 31. When a polymeric material is employed for the legs, again, any polymeric material that has sufficient strength and flexibility to perform the functions required for operation of the fly-fishing tweezers 10.

Legs 22a and 22b are joined together at their upper proximal end 30, as by forming them integrally from a single piece of metal. Formed either as an integral portion or as individual structures, a pair of gripping members 24a and 24b are positioned on the inner surface of each leg 22a and 22b near the distal end.

Legs 22a and 22b are also configured to include arcuate camming portions 28a and 28b. Engaged over the legs and arcuate camming portions is a locking slide 32 with a rectangular opening designed to receive legs 22a and 22b. Locking slide 32 can be fabricated from either a preferred polymeric or an alternate metallic material. The polymeric or metallic material that is to be used for locking slide 32 can be made of any material which has sufficient strength and a low coefficient of friction to perform the functions required for operation of the fly-fishing tweezers 10. For purposes of disclosure here, upper end 30 will sometimes be referred to as being at the proximal end and the separated ends near gripping members 24a and 24b referred to as being at the distal end of the fly-fishing tweezers 10. Closure and locking of the gap between the legs is facilitated by moving slide 32 from its unbiased proximal position to its distal locking position. It is equally important, however, that the legs 22a and 22b are able to return to the relaxed, unstressed configuration shown in FIG. 2. This ability to return to the unstressed relaxed configuration is facilitated by the resilience of the legs 22a and 22b. Therefore, moving the locking slide 32 to its proximal position allows the legs to spread apart and assume their normal, open position as shown in FIG. 2.

Projecting perpendicular from the longitudinal axis and in close proximity with proximal end 30 is a radially protruding rod 26 having an approximate diameter 40. The protruding rod 26 is fixed to the proximal end 30 and is intended to be held between the index finger and the thumb to facilitate rotation of the tweezers 10 around a centrally located fishing hook 18. Protruding rod 26 can be fitted with a rotating sleeve 37 which rides within a groove in rod 26 to further enhance its ability to facilitate the rotation of tweezers 10. Rotating sleeve can be made from a metallic or polymeric material but must have the property of a relatively low coefficient of friction with the shaft of rod 26.

FIG. 3 is a side elevational view of the first embodiment of fly-fishing tweezers 10. Shown in this view is a side view of one leg 22a or 22b with tapered section 36. The locking slide 32 is shown in its proximal position which allows the legs to relax and form gap 27.

FIG. 4 demonstrates an alternate embodiment of the present invention. Replacing the protruding rod used to facilitate the rotation of the tweezers around a central axis, this embodiment employs a ring member 34 mounted to the upper proximal end 30 of fly-fishing tweezers 10. An annular sleeve 39 can be incorporated within ring member 34 to facilitate rotation. The diameter 38 of the ring member must be sized to loosely fit, preferably, the index finger of many different operators. It is not essential that the operator use the index finger, but whatever finger fits loosely within the ring member and can be comfortably used to rotated tweezers 10 can be employed. Also shown in this view is a side view of one leg 22a or 22b with tapered section 36. The locking slide 32 is shown in its proximal position which allows the legs to relax and form a gap 27.

Exact values for the dimensions for the many of structures described in this specification are unimportant. What matters for some are their relative values. The relative dimension between the gap 27 of the fly-fishing tweezers 10 and the hackle or fishing line are important in that the gap 27 should be larger enough to easily receive the hackle or line but not be so wide as to make it difficult to maintain the postion of the hackle within the gap was the legs are flexed towards each other. Further, the diameter 38 of ring member 34 should loosely match the operator's fingers. In addition, the length of rectangular opening of lockable slide 32 must be dimensioned to closely fit the width 46 of the tweezers 10. Furthermore, the width of rectangular opening of lockable slide 32 must be dimensioned to closely ride over arcuate camming surface 28a and 28b to force the legs 22a and 22b towards each other resulting in a final configuration were the gripping members 24a and 24b are firmly engaged.

OPERATION

In the operation of the fly-fishing tweezers 10 of the present invention, the hackle or fishing line is first poised within the aperture or gap 27 between gripping means 24a and 24b as shown in FIG. 2. The locking slide 32 is then advanced towards the distal end forcing the legs 22a and 22b towards each other until the hackle or fishing line is firmly engaging between the gripping means.

Once firmly engaged, the hackle 12 or fishing line and tweezers are then rotated around a centrally located fishing hook 18, for the purpose of winding hackle 12 around the shaft 15 of hook 18.

Once a sufficient amount of hackle 12 is wound around the hook 18, hackle 12 is secured to the hook 18 by tying it with thread around the shaft 15 and cutting the remaining hackle from the secure portion on hook 18.

While the particular FLY-FISHING TWEEZERS as herein shown and disclosed in detail are fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. Tweezers for tying hackle on fly-fishing hooks comprising:

a pair of flexible legs, each leg having a proximal end, a distal end and a longitudinal axis between said ends, each leg further having an outwardly directed surface and an inwardly directed surface, said legs fixedly joined at said proximal ends forming a proximal joint, said joint having an outwardly facing surface;

gripping portions mounted on said outwardly directed surface of said legs and positioned on said distal end of said legs;

an arcuate camming configuration on the outwardly directed surface of said legs and intermediate the ends thereof;

a locking slide embracing said legs to slidably engage over said arcuate camming configuration so that when moved from a proximal position to a distal position, said locking slide flexes said legs together and forces said gripping portions together; and a cylindrical rod member secured to said outwardly facing surface of said proximal joint, said rod member projecting perpendicular from said longitudinal axis.

2. Tweezers for tying hackle on fly-fishing hooks as recited in claim 1 further comprising a lateral projection extending from said locking slide.

3. Tweezers for tying hackle on fly-fishing hooks as recited in claim 1 wherein said legs are made of a metallic material.

4. Tweezers for tying hackle on fly-fishing hooks as recited in claim 1 wherein said legs are made of a polymeric material.

5. Tweezers for tying hackle on fly-fishing hooks as recited in claim 1 wherein said locking slide is made of a metallic material.

6. Tweezers for tying hackle on fly-fishing hooks as recited in claim 1 wherein said locking slide is made of a polymeric material.

7. Tweezers for tying hackle on fly-fishing hooks as recited in claim 1 further comprising a sleeve rotatably engaged with said cylindrical rod member.

* * * * *